United States Patent
Hermann et al.

(10) Patent No.: US 12,370,472 B2
(45) Date of Patent: Jul. 29, 2025

(54) ASSEMBLY COMPRISING A FILTER PLATE AND AN ATTACHMENT PART

(71) Applicant: JVK Filtration Systems GmbH, Georgensgmund (DE)

(72) Inventors: Manfred P. Hermann, Nuremberg (DE); Bernhard Salbaum, Rottenbach (DE)

(73) Assignee: JVK Filtration Systems GmbH, Georgensgmund (DE)

( * ) Notice: Subject to any disclaimer, the term of this patent is extended or adjusted under 35 U.S.C. 154(b) by 807 days.

(21) Appl. No.: 16/628,325

(22) PCT Filed: Jul. 4, 2018

(86) PCT No.: PCT/EP2018/068094
§ 371 (c)(1),
(2) Date: Jan. 3, 2020

(87) PCT Pub. No.: WO2019/008037
PCT Pub. Date: Jan. 10, 2019

(65) Prior Publication Data
US 2020/0147522 A1    May 14, 2020

(30) Foreign Application Priority Data
Jul. 5, 2017   (DE) .................... 20 2017 104 018.6

(51) Int. Cl.
*B01D 25/12*   (2006.01)
*B01D 25/176*  (2006.01)
(Continued)

(52) U.S. Cl.
CPC ......... *B01D 25/215* (2013.01); *B01D 25/176* (2013.01); *B01D 2201/4084* (2013.01)

(58) Field of Classification Search
CPC ................ B01D 25/215; B01D 25/176; B01D 2201/4084; B01D 25/164; F16B 5/0044; F16B 5/0664; F16B 5/126
(Continued)

(56) References Cited

U.S. PATENT DOCUMENTS

| 4,608,164 A | 8/1986 | Neu |
| 5,051,179 A | 9/1991 | Hermann |

(Continued)

FOREIGN PATENT DOCUMENTS

| CN | 2403479 Y | 11/2000 |
| CN | 2514891 Y | 10/2002 |

(Continued)

OTHER PUBLICATIONS

International Search Report from corresponding International Patent Application No. PCT/EP2018/068094, dated Oct. 5, 2018.
(Continued)

*Primary Examiner* — Madeline Gonzalez
(74) *Attorney, Agent, or Firm* — Weitzman Law Offices, LLC

(57) ABSTRACT

An assembly comprising a filter plate for filter press and at least one attachment part, wherein the filter plate has a filter chamber boundary surface, by means of which a filter chamber to be formed in the filter press can be bounded. At least one channel for a fluidic connection to the filter chamber boundary surface is formed in the filter plate, and the attachment part is detachably fastened to the filter plate at the channel by means of at least one detachable ball-type snap-in connection. The ball-type snap-in connection comprises at least one ball pin and at least one coupling. An assembly comprising such a filter plate for a filter press and at least one attachment part, in which the attachment part is detachably fastened to the filter plate by means of at least
(Continued)

one ball-type snap-in connection and has an opening which is arranged in the channel.

21 Claims, 12 Drawing Sheets

(51) Int. Cl.
    *B01D 25/21*     (2006.01)
    *F16B 5/00*     (2006.01)
    *F16B 5/06*     (2006.01)
    *F16B 5/12*     (2006.01)

(58) Field of Classification Search
    USPC ....... 210/230, 224, 228, 231, 232, 346, 347, 210/486
    See application file for complete search history.

(56) References Cited

U.S. PATENT DOCUMENTS

| | | | |
|---|---|---|---|
| 5,480,133 A | 1/1996 | Motev et al. | |
| 5,762,786 A | 6/1998 | Oelbermann | |
| 6,852,220 B1 | 2/2005 | Grafen et al. | |
| 9,527,019 B2 | 12/2016 | Hermann | |
| 2006/0180553 A1 | 8/2006 | Pfeiffer | |
| 2007/0251873 A1* | 11/2007 | Maquet | B01D 33/23 210/232 |
| 2012/0189508 A1 | 7/2012 | Kreidler | |
| 2013/0043175 A1* | 2/2013 | Hara | B01D 25/176 24/453 |
| 2015/0182883 A1 | 7/2015 | Hermann et al. | |

FOREIGN PATENT DOCUMENTS

| | | |
|---|---|---|
| CN | 2647396 Y | 10/2004 |
| CN | 101249327 A | 8/2008 |
| CN | 102240468 A | 11/2011 |
| CN | 1025850541 A | 7/2012 |
| CN | 103889536 A | 6/2014 |
| CN | 104083911 A | 10/2014 |
| CN | 204034358 U | 12/2014 |
| CN | 104349828 A | 2/2015 |
| CN | 204841081 U | 12/2015 |
| CN | 105396343 A | 3/2016 |
| CN | 105944419 A | 9/2016 |
| CN | 206298397 U | 7/2017 |
| DE | 3608774 A1 | 9/1987 |
| DE | 19956617 A1 | 6/2001 |
| DE | 20317546 U1 | 5/2004 |
| EP | 0357015 A2 | 3/1990 |
| EP | 0357015 B1 | 3/1990 |
| EP | 0384081 A2 | 8/1990 |
| EP | 579103 A2 * | 1/1994 ........... B01D 25/176 |
| EP | 2493587 B1 | 9/2012 |
| GB | 1570108 A | 6/1980 |
| GB | 2176418 A | 12/1986 |
| JP | S53-024952 A | 3/1978 |
| JP | S58-000207 A | 1/1983 |
| JP | S58-86206 U | 6/1983 |
| JP | 0249764 B2 | 10/1990 |
| RU | 102196 U1 | 2/2011 |
| WO | WO 03/095063 A1 | 11/2003 |
| WO | WO 2004/043569 A2 | 5/2004 |
| WO | WO 2005/046837 A1 | 5/2005 |
| WO | WO 2006/111378 A1 | 10/2006 |
| WO | WO 2009/012884 A1 | 1/2009 |
| WO | 2011051428 A1 | 5/2011 |
| WO | WO2011/155273 A1 | 12/2011 |

OTHER PUBLICATIONS

Yu Huimin, Plate and frame filter press with extrusion membrane—Modification of ordinary plate and frame filter press, Relevant pp. 25-27, Dec. 27, 1990, China.

* cited by examiner

ASSEMBLY COMPRISING A FILTER PLATE AND AN ATTACHMENT PART

FIELD OF THE INVENTION

The present invention relates to an assembly comprising a filter plate for filter press and at least one attachment part, wherein the filter plate has a filter chamber boundary surface, by means of which a filter chamber to be formed in the filter press can be bounded. At least one channel for a fluidic connection to the filter chamber boundary surface is formed in the filter plate, and the attachment part is detachably fastened to the filter plate at the channel by means of at least one detachable ball-type snap-in connection. The present invention further relates to an assembly comprising such a filter plate for a filter press and at least one attachment part, in which the attachment part is detachably fastened to the filter plate by means of at least one snap-in connection and has an opening which is arranged in the channel.

BACKGROUND OF THE INVENTION

It is known to form a filter pack for a filter press, which filter pack consists of a plurality of adjacently arranged filter plates. Filter chambers are formed between each of the filter plates. The filter plates for this purpose have a central filter area and a sealing edge framing the central filter area. The filter plates can be moved away from one another and towards one another in the filter press, whereby the filter chambers can be opened and closed.

Each filter chamber usually has at least one infeed and one outfeed as a channel to the filter chamber. The suspension to be filtered, which is also referred to as a slurry, flows via the infeed into the filter chamber. The suspension is then filtered by means of a filter cloth, wherein the solids are retained by the filter cloth in the filter chamber, such that what is known as a filter cake is formed. The filtrate freed from the solids is conducted out of the filter chamber via at least one outfeed channel.

In order to reduce the residual moisture in the filter cake in a special case and in order to reduce the filtration times, filter presses are known in which at least one filter plate has a membrane. A filter plate of this kind is referred to as a membrane filter plate. In a filter press with membrane filter plates a press filtration follows on from the pressure filtration performed initially, in which a pressure medium is applied to the elastic membranes of the filter chambers so that they constrict the space in which the filter cake is situated. The filter cake is compressed in this way, whereby the cavities of the filter cake are made smaller and therefore the residual moisture in these cavities is further reduced. If a membrane filter plate is used, what is known as a chamber filter plate and a membrane filter plate, to which filter cloths are fastened, are arranged adjacently in pairs in a filter pack.

Such a filter press is described for example in WO 03/095063 A1. In the filter press described there a plate pack is formed, which comprises a chamber filter plate and a membrane filter plate in alternation. The chamber filter plate has a filter cloth on each of its two sides, which is fastened in each case in a recess in the main body of the filter plate. The membrane plate has a membrane and a filter cloth on each of its two sides, which are also fastened in each case in a recess on both sides of the main body of the membrane filter plate. In the filter press there is a filter chamber formed between the filter chamber boundary surface of the chamber filter plate and the membrane of the membrane filter plate. A pressure chamber is formed between the membrane and the main body of the membrane filter plate. A distance may be provided between the filter cloth and the filter chamber boundary surface of the chamber filter plate in the direction of the plate plane, such that an infeed opening for the suspension to be filtered may lead into the filter chamber.

In order to supply the suspension to be filtered, the filter plates usually have a bore. In the assembled state of a plurality of filter plates in the filter press, these bores form an infeed channel. In order to conduct the suspension from the infeed channel into the filter chamber of a filter plate, an attachment part, for example a distributor ring, is arranged on the filter plate. A support ring or a further distributor ring may be arranged adjacently to the distributor ring. The distributor ring and the support ring are fastened to the main body by means of connection elements, for example screws. Such an assembly comprising a distributor ring and a support ring is described in WO 2009/012884 A1.

DE 199 56 617 A1 discloses a filter plate for a filter press which comprises a filling element. The filling element has branch channels which lead into a filter chamber. The filling element and the adjacent filter plate have grooves into which there is inserted a rubber-elastic ring seal.

DE 203 17 546 U1 describes a filter plate with a support ring encircling an axial slurry feed opening. The support ring has flange parts which are fastened in the manner of a snap-in connection or detent connection.

EP 2 493 587 B1 describes a filter plate with a main body and an elastic element which is fastened annularly to the main body by means of a snap-in connection. A temperature-control plate is fastened to the elastic element and is made of a heat-conductive material.

EP 0 357 015 B1 describes a membrane filter plate for a filter press in which a dovetail-shaped recess is formed in the membrane-retaining frame and receives a dovetail-shaped membrane edge. A groove is in turn provided in the dovetail-shaped membrane edge and receives a protrusion of a cover frame for fastening the cover frame to the membrane.

WO 2004/043569 A2 describes a membrane filter plate which comprises a main plate with thickened edge region, a membrane made of an elastically deformable material, and a filter cloth. The membrane has an annular bead which engages in a complementary groove in the main plate.

When a filter plate is to be used it is necessary to remove attachment parts and to then reassemble them. When the filter cloth is replaced, the distributor ring has to be disassembled, for example. In this regard it has been found that conventional fastenings of the attachment part to the main body, during operation, may adversely affect the functionality of the filter plate following disassembly and reassembly of the attachment part. The attachment part may also be a wearing part, in particular a wearing part in a filtrate discharge channel. This part has to be replaced from time to time. To this end a detachable connection of the attachment part is necessary.

It is known for example to screw on the attachment part by means of screws, which engage in a thread. During operation of the filter press, pressures of more than 15 bar occur. At such high pressures, solids may be pressed into the thread. In particular in the case of stainless steel, this may cause the thread to become blocked. Such a blocking poses a large problem, since the attachment part is then no longer detachable.

SUMMARY OF THE INVENTION

The object of the present invention is therefore to provide an assembly of the kind described at the outset which has an improved fastening of the attachment part to the filter plates, as a result of which long-term functionality of the assembly during operation is ensured.

This object is achieved in accordance with the invention by an assembly having the features of the independent claim(s). Advantageous embodiments and developments are described in the dependent claims.

In the assembly according to the invention the ball-type snap-in connection comprises at least one ball pin and at least one coupling.

In this document a ball-type snap-in connection is understood to mean the connection of two elements by means of elastic forces, wherein one element of the ball-type snap-in connection is spherical. This means that at least a cross-section of the spherical element has a circle-like, in particular circular perimeter. The circle-like perimeter extends in particular at least over 50% of the total perimeter of the element. The perimeter line does not have to run exactly over a circular path. In particular, it may also be flattened in areas, for example. In an insertion direction of the element for the ball-type snap-in connection, however, the transverse extent of the cross-section firstly widens so as to become smaller again once the maximum transverse extent has been reached.

As a result of this embodiment of the ball-type snap-in connection, it can be ensured on the one hand that the attachment part is held reliably and firmly on the filter plate. On the other hand, however, the connection can also be easily released by the user in order to dismantle the attachment part and then fasten it again to the filter plate.

Compared to a conventional fastening of the attachment part by means of screws, a snap-in connection has the advantage that when the fastening of the attachment part is released, no loose, small connection elements such as screws or nuts, which may become lost, are produced. Specifically, with long-term operation of the filter plate, it has been found that loose connection elements of this kind, once they have been lost, are not replaced or are replaced by inadequate connection elements, whereby the functionality of the filter plate is impaired during the subsequent operation of the filter plate in a filter press. When releasing the attachment part, which in accordance with the invention is fastened to the filter plate by means of a snap-in connection, no such loose connection elements, which may become lost, are produced. At the same time, however, a snap-in connection ensures a reliable and durable fastening of the attachment part to the filter plate.

In addition, in the case of the fastening according to the invention of the attachment part by means of the snap-in connection, it is ensured that the attachment part can be reliably detached from the filter plate also if solids are guided past the snap-in connection at the high pressures occurring during operation of the filter press and might possibly infiltrate the connection.

Here, a snap-in connection is understood to mean the detachable connection of two elements by means of elastic forces.

In accordance with a further embodiment of the assembly according to the invention, the attachment part has an opening which is arranged in the channel. The attachment part may produce a fluidic connection from the channel to the filter chamber boundary surface, i.e. to the filter chamber during operation of the filter plate. In any case, a filter cloth may still be arranged between the filter chamber boundary surface and the filter chamber.

In accordance with an embodiment of the assembly according to the invention the attachment part is a distributor ring and the channel is an infeed channel for supplying the suspension that is to be filtered into the filter chamber, wherein the suspension that is to be filtered can be supplied to the filter chamber by means of the distributor ring. The infeed channel is also referred to as a slurry bore.

Furthermore, the attachment part may be a support ring, and the channel may be an infeed channel for supplying the suspension that is to be filtered into the filter chamber, wherein the support ring is arranged adjacently to a distributor ring, through which the suspension that is to be filtered can be supplied to the filter chamber.

The attachment part may also be formed as a supporting cam. This protrudes in the transverse direction of the filter plate. It is used to support a base of the filter plate on a corresponding supporting cam of an opposite base of an adjacent filter plate in a filter press. The supporting cam can prevent the base from deflecting during the filter process and the filter press. The fastening of the supporting cam via the ball-type snap-in connection has the advantage that the movability of the connection of the supporting cam with the filter plate is increased and the introduction of force when the filter press is closed can be improved. The supporting can may be fastened at the channel to the filter plate. In particular, it may be arranged around the channel. Alternatively, however, the supporting cam may also be fastened to the filter plate in addition to another attachment part, wherein the other attachment part is fastened at the channel of the filter plate.

Furthermore, the attachment part may be a membrane. This can be connected to the filter plate in particular at the corners via the above-described detachable ball-type snap-in connections. A pre-fixing of the membrane may be achieved advantageously as a result.

In these embodiments of the assembly the distributor ring, the support ring, the supporting cam or the membrane can thus be detached very easily from the filter plate, for example in order to replace the filter cloth. Here, there is no risk of loose connection elements becoming lost and of the distributor ring, the support ring, the supporting cam or the membrane then being fastened again to the filter plate inadequately.

The distributor ring is supported by the support ring, such that the stability of the distributor ring is increased. In the case of a membrane the plate, the membrane may also be supported, and the filter cloth possibly be protected, by the support ring.

Furthermore, the attachment part may be a further distributor ring. For example, a chamber filter plate may comprise two distributor rings.

In accordance with a further embodiment of the assembly according to the invention, the filter plate has a first contact face around an opening forming the channel, and the attachment part has a second contact face around its opening. The ball-type snap-in connection is in this case formed in particular in the region of the contact faces, such that, when the attachment part is connected to the filter plate, the contact faces are held in abutment against one another. Due to the mutually abutting contact faces, the sealing effect for the connection between the attachment partner filter plate is improved.

The ball-type snap-in connection according to the invention may also advantageously compensate for spacing differences which may occur between the attachment part and the filter plate, since elastic forces are effective during the connection. If, for example, a filter cloth is clamped between a distributor ring and the filter plate, changes in the thickness of the clamped cloths may be compensated for with the elastic ball-type snap-in connection. In this way, as the filter press is closed, the cloths may be pressed in liquid-tight fashion between the distributor ring and a plate bore. By contrast, in the case of a screwed connection, the distance between the support ring or distributor ring and the filter plate when a filter cloth is clamped is fixed. If the thickness of the filter cloth changes, no elastic forces which continue to press the distributor ring or support ring against the filter plate are effective, and therefore the connection might no longer be liquid-tight.

In order to further improve this sealing effect, a ring seal can be arranged between the filter plate and the attachment part at the contact faces. This ring seal surrounds the opening of the attachment part or the infeed channel. For example, at least one of the contact faces may have a groove for receiving a sealing round cord.

Furthermore, the attachment part may be an abrasion protection means. In this case, the channel may be, for example, a discharge channel for removing the filtrate from the filter chamber. The abrasion protection means is then arranged in or at the discharge channel, in particular beneath a filter cloth, or behind the filter cloth in the discharge direction, or is arranged at an outfeed opening of the discharge channel. Such an abrasion protection means is used to protect the outfeed opening or the walls of the discharge channel if, for further drying of the filter cake, compressed air is blown against the exit direction of the filtrate through the filter plate and in so doing entrains solid particles. Abrasion particles may in this case damage the walls of the outfeed opening or of the discharge channel. The abrasion protection means is therefore a wear protection means, which has to be replaced frequently.

In accordance with another embodiment of the filter plate according to the invention, the coupling is made in particular of an elastomer. It is therefore elastic. The ball pin is in this case in particular not elastic, and therefore the coupling holds the ball pin elastically. Conversely, in accordance with another embodiment the ball pin is elastic and the coupling is not elastic.

The ball pin for example is made of metal or a plastics material, in particular a plastics material that is rigid relative to the coupling. The ball pin may comprise a stem, which is adjoined by a spherical termination element. The coupling in this case may comprise a ball socket for receiving the spherical termination element.

The coupling in particular has an entry opening for the spherical termination element of the ball pin. The maximum transverse extent of the spherical termination element is in this case greater than the maximum transverse extent of the entry opening of the coupling. As the spherical termination element is introduced into the coupling via the entry opening, the entry opening is thus widened elastically. If the spherical termination element sits in the coupling, it is thus held elastically at the entry opening of the coupling.

In accordance with an embodiment of the assembly according to the invention the ball pin is arranged on the filter plate and the coupling is arranged on the attachment part. Conversely, in accordance with another embodiment the coupling is arranged on the filter plate and the ball pin is arranged on the attachment part.

In accordance with an embodiment of the assembly according to the invention if the attachment part is arranged in the infeed channel or around an opening of the infeed channel, it may be fastened to the filter plate by means of a plurality of ball-type snap-in connections, wherein the ball-type snap-in connections are arranged around an opening in the attachment part and the channel-forming opening, with the ball-type snap-in connections being arranged in particular concentrically about the opening of the attachment part. In this case the ball-type snap-in connections are in particular ball pins and corresponding couplings, which are arranged around the opening of the attachment part. It is hereby preferably ensured that the fastening of the attachment part of the filter plate produced by the ball-type snap-in connections is fluid-tight.

A further aspect of the invention relates to an assembly comprising a filter plate for a filter press and at least one attachment part, wherein the filter plate has a filter chamber boundary surface, by means of which a filter chamber to be formed in the filter press can be bounded, at least one channel for a fluidic connection to the filter chamber boundary surface is formed in the filter plate, and the attachment part is fastened to the filter plate at the channel. The attachment part is fastened to the filter plate detachably by means of at least one snap-in connection and has an opening which is arranged in the channel. In accordance with the invention the attachment part is fastened to the filter plate by means of at least one detachable ball-type snap-in connection.

The use of the detachable ball-type snap-in connection has the above-described advantages.

In accordance with an embodiment of the assembly according to the invention according to the second aspect, the ball-type snap-in connection comprises an annular pin-like protrusion and a ring groove associated with the protrusion. By way of a ball-type snap-in connection via an annular protrusion, which can engage in the ring groove and together therewith produces the ball-type snap-in connection, a particularly reliable connection can be produced between the attachment part and the filter plate, wherein the retaining forces are exerted annularly. In particular, it can hereby be ensured that the fastening of the attachment part to the filter plate produced by the ball-type snap-connections is fluid-tight.

In this document an annular protrusion or a ring groove is understood to mean that the protrusion and the groove lie in a specific way on a curved line. A closed ring does not have to be provided, although a closed annular structure is preferred. The ring form can be formed in various geometries, but in particular assumes the form of a circular ring.

The annular pin-like protrusion in a cross-section formed perpendicularly to its peripheral direction for example has an eyebolt, which is adjoined by a spherical annular termination element. Since the eyebolt of the protrusion formed in the cross-section extends annularly, this part of the protrusion can also be referred to as an annular rib. The spherical annular termination element has the form of a cylinder that is curved in a ring form, wherein the cross-section of the cylinder is disc-like, as defined further above.

In accordance with an embodiment of the assembly according to the invention according to the second aspect, the ring groove has an annular first entry opening to an annular first groove hollow body, wherein the maximum transverse extent of the first entry opening in a cross-section formed perpendicularly to the circumferential direction of the ring groove is smaller than the maximum transverse extent of the first groove hollow body with this cross-section. The ring groove thus has a constriction at the entry opening. It then widens inwardly to the first groove hollow body. For example, the ring groove may be dovetail-shaped. An element can be held in the ring groove in this way.

In accordance with a further embodiment of the assembly according to the invention according to the second aspect, the ball-type snap-in connection comprises an annular adapter ring, which is formed correspondingly to the ring groove. The snap-in connection between the attachment part and the filter plate can be produced via this adapter ring.

The adapter ring is made in particular of an elastomer. For example, the adapter ring is a rubber ring, wherein the rubber ring can be produced both from natural rubbers and from synthetic rubbers, as well as from thermoplastic elastomers. In this way, a snap-in connection between these two parts can be produced by the adapter ring regardless of the material of the attachment part and the filter plate, more specifically in particular also if the attachment part and the filter plate are dimensionally stable, for example are made of a dimensionally stable plastics material.

The adapter ring, in particular in a cross-section formed perpendicularly to its circumferential direction, has an outer face which corresponds to the inner face of the ring groove, such that the adapter ring can be inserted into the ring groove and held therein form-fittingly. The outer face of the adapter ring is thus in particular also dovetail-shaped.

A further ring groove, which has an annular second entry opening to an annular second groove hollow body, is also formed in the adapter ring, wherein the maximum transverse extent of the second entry opening in a cross-section formed perpendicularly to the circumferential direction of the adapter ring is smaller than the maximum transverse extent of the second groove hollow body with this cross-section. The parts to be held via the ball-type snap-in connection can be inserted into the further ring groove. For this purpose, the maximum transverse extent of the spherical annular termination element of the pin-like protrusion is in particular greater than the maximum transverse extent of the second entry opening of the adapter ring. The circular cross-sectional form of the spherical annular termination element corresponds to the cross-sectional form of the second groove hollow body. The spherical annular termination element of the protrusion may thus be held in the further ring groove of the adapter ring.

The adapter ring in particular has an inner face forming the second groove hollow body, which inner face corresponds to the surface of the annular pin-like protrusion, such that the annular pin-like protrusion can be inserted into the second groove hollow body. It has been found that the combination of the dovetail-shaped cross-sectional form of the groove for receiving the adapter ring and of the further groove formed in the adapter ring with a circular cross-sectional shape leads to a particularly reliable and easily handled connection between the attachment part in the filter plate.

If the ball-type snap-in connection comprises the annular pin-like protrusion and the ring groove, the annular pin-like protrusion is in particular arranged on the attachment part and the ring groove is arranged on the filter plate. A reversed assembly, however, is also possible.

In accordance with an embodiment of the assembly according to the invention according to the second aspect of the invention, the attachment part is a distributor ring, a support ring, a supporting cam, an abrasion protection means and/or a membrane as already explained above in detail.

BRIEF DESCRIPTION OF THE DRAWINGS

The invention will now be explained on the basis of exemplary embodiments with reference to the drawings.

DETAILED DESCRIPTION OF THE INVENTION

Figure 1:
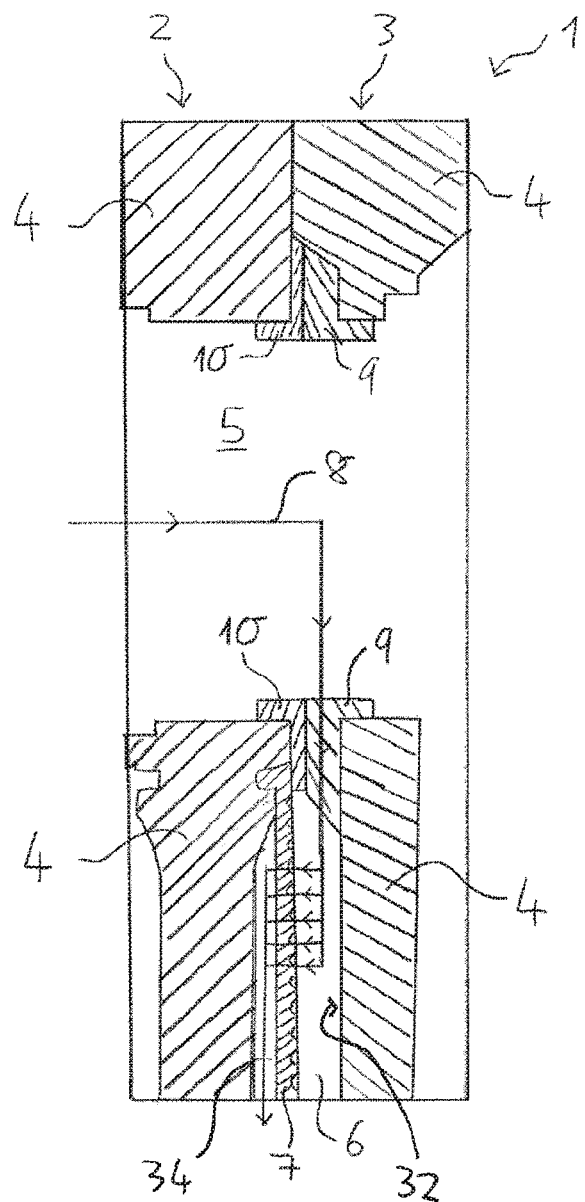
FIG. 1 schematically shows the general structure of an edge region of a filter plate pair for a filter press, wherein the infeed channel for the slurry is arranged outside the sealing edge.

The general structure of a filter plate pack 1 with an arrangement in a filter press will be described first with reference to FIG. 1.

The filter plate pack 1 comprises a membrane filter plate 2 and a chamber filter plate 3. The filter plate pack 1, however, may also be formed by other combinations of filter plates, for example from a plurality of chamber filter plates 3. The filter plates 2 and 3 comprise a main body 4. In the chamber filter plate 3 the main body 4 may also be the filter plate itself. In the example shown in FIG. 1 an infeed channel 5 for the suspension that is to be filtered, which is also referred to as a slurry, is formed in the edge region of the main body 4. This infeed channel 5 may also be formed centrally in the middle of the filter plates 2 and 3, as will be explained later. A filter chamber 6 is formed between the membrane filter plate 2 and the chamber filter plate 3 and is delimited on one side by a filter chamber boundary surface 32. In the filter chamber 6, a filter cloth 7 is fastened in a groove of the membrane filter plate 2 by means of a fastening element provided at the edge. A filter cloth (not shown) is also arranged in the chamber filter plate 3, adjacently to the filter chamber boundary surface 32.

Figure 2:
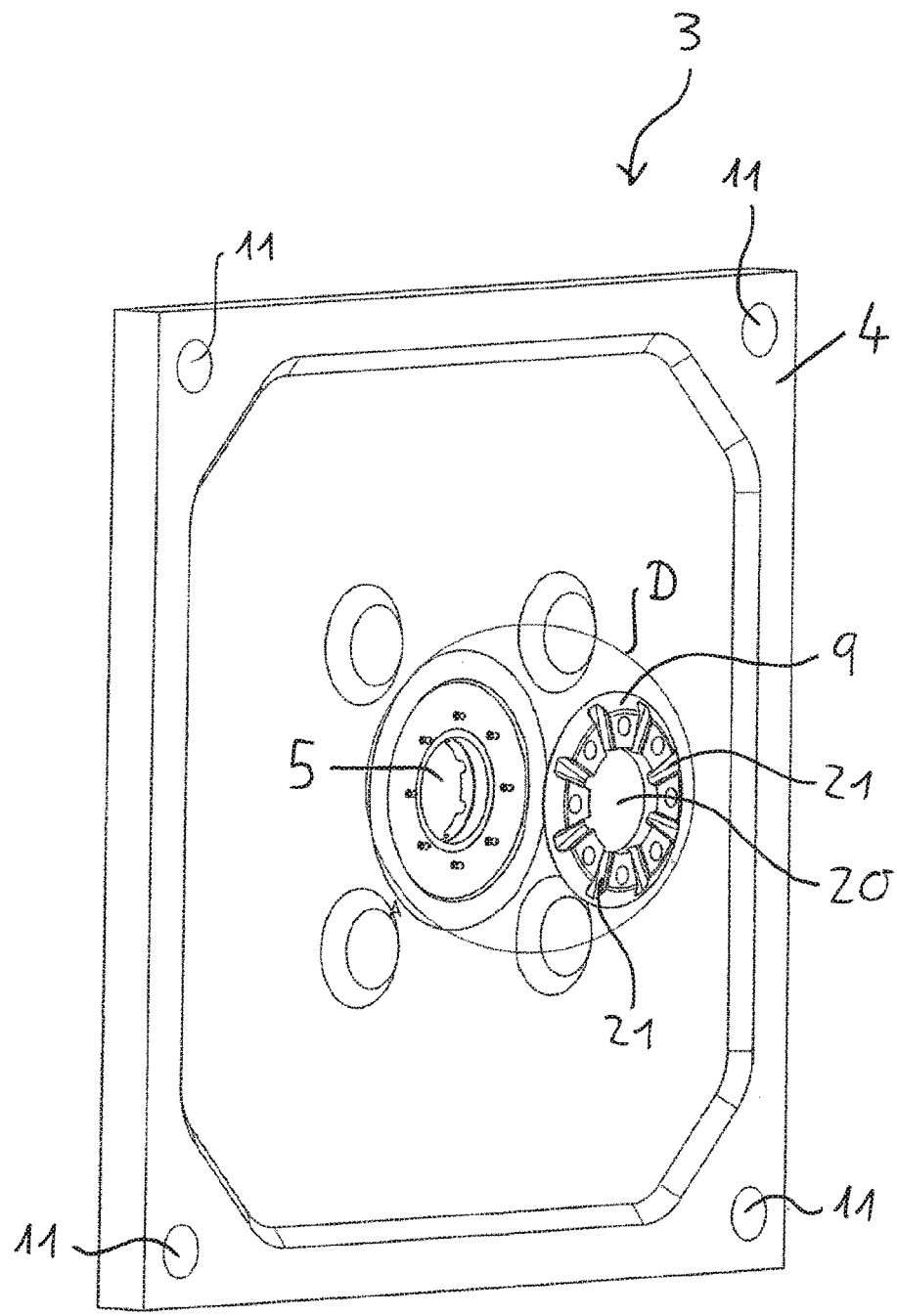
FIG. 2 shows a first exemplary embodiment of the assembly according to the invention, in which the infeed channel for the slurry is arranged in the middle of the filter plate.
Figure 3:
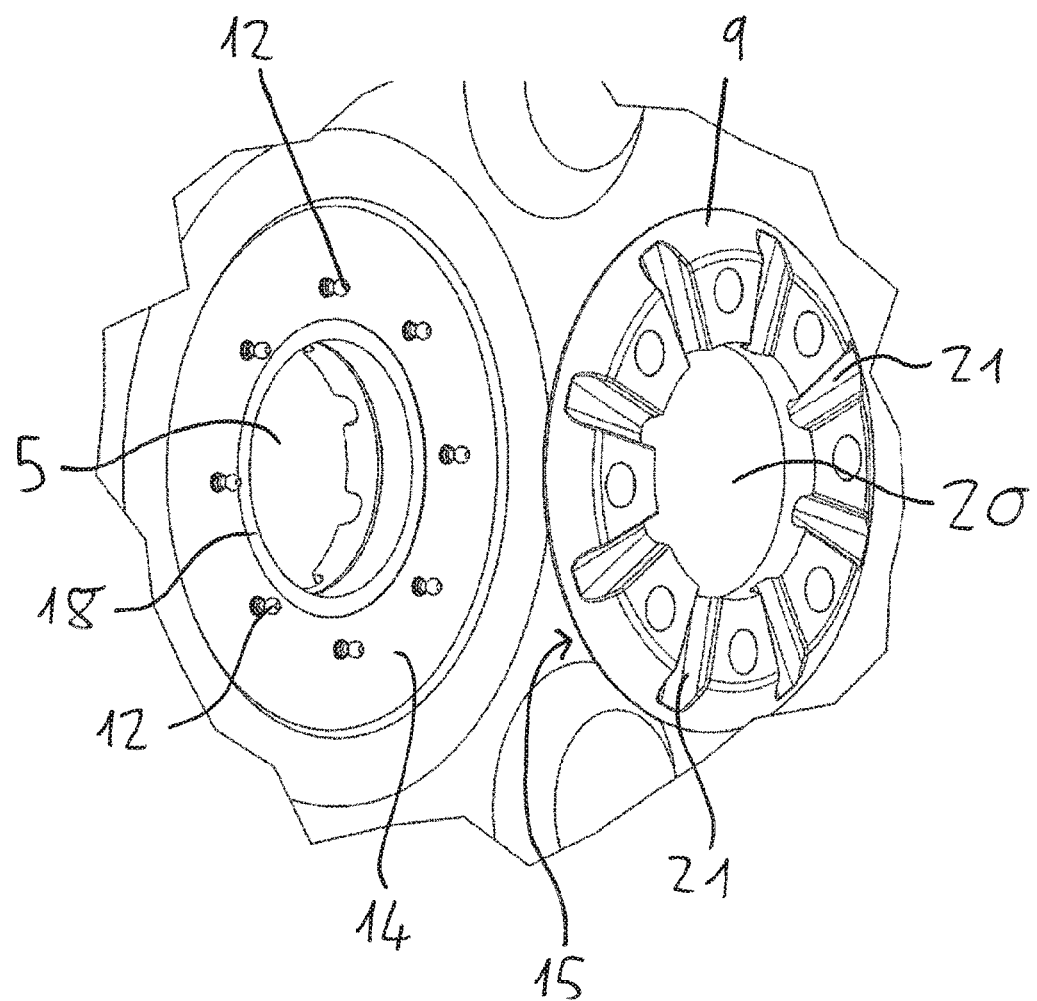
FIG. 3 shows the detail D from the depiction of FIG. 2.

A distributor ring 9 is inserted into the chamber filter plate 3. The distributor ring 9 has a plurality of distribution channels 21, which provide a fluidic connection from the infeed channel 5 into the filter chamber 6, as is shown in FIG. 2. A support ring 10 is arranged adjacently to the distributor ring 9, such that the distributor ring 9 and the support ring 10 are clamped sealingly between the membrane filter plate 2 and the chamber filter plate 3. In this way, the filter chamber 6 is closed off by the distributor ring 9 and the support ring 10, such that on the inflow side to the infeed channel 5 a fluidic connection exists only via the distribution channels 21 of the distributor ring 9.

The filtration path 8 is also shown in FIG. 1. The suspension is supplied to the infeed channel 5. From there, the suspension passes via the distribution channels 21 of the distributor ring 9 into the filter chamber 6. The liquid component of the suspension passes through the filter cloth 7 and is discharged via collection channels of a membrane (not shown). The collection channels are connected to filtrate bores 11 (see FIG. 2) via discharge channels 34 for the filtrate, and the filtrate is discharged via said filtrate bores.

The infeed channel 5 may be formed not only in the region of the sealing edge in the filter plates 2 and 3. It is also possible that the infeed channel is formed centrally in the middle of the filter plates 2 and 3. The general structure of such a filter plate pack is known per se and is described for example in WO 2009/012884 A1.

The conventional filter plates, as described for example in WO 2009/012884 A1 or WO 2006/111378 A1, are attachment parts such as the distributor ring 9 or the support ring 10 are fastened by means of inserted connection elements or screws. In the case of the filter plate according to the invention an attachment part, such as the distributor ring 9, is connected differently, as will be explained hereinafter on the basis of a first exemplary embodiment with reference to FIGS. 2 to 6:

In the example shown in FIG. 2 the chamber filter plate 3 comprises a central infeed channel 5. The infeed channel 5, however, could also be arranged equally at the edge, as described with reference to FIG. 1. The filtrate bores 11 are arranged in the corners in FIG. 2.

The distributor ring 9 is fastened as attachment part to the main body 4 of the chamber filter plate 3 or to the chamber filter plate 3 itself. To this end, a first contact face 14 is formed on the main body 4 around the infeed channel 5. Ball pins 12 are arranged on this first contact face 14, concentrically around the infeed channel 5, and protrude from the first contact face 14.

A second contact face 15, corresponding to the first contact face 14, is formed at the distributor ring 9 and has couplings 13 arranged on it, which correspond to the ball pins 12 of the main body 4. The couplings 13 are integrated in the distributor ring 9. Although the couplings 13 and the distributor ring 9 are made of different materials, they are formed integrally. In order to fasten the distributor ring 9 to the main body 4, the distributor ring 9 is fitted with the couplings 13 onto the ball pins 12 such that the distributor ring 9 is fastened to the main body by means of detachable ball-type snap-in connections. The ball-type snap-in connections between the ball pins 12 and the couplings 13 are formed such that the first and second contact faces 14, 15 are pressed against one another.

A ring seal 18 is arranged at the first contact face 14 around the infeed channel 5, such that a sealing connection to the distributor ring 9 is produced as the distributor ring 9 is fastened to the main body 4. The ring seal 18 may be formed here by a groove and a round cord in the first contact face 14.

The distributor ring 9 has an opening 20, which adjoins the infeed channel 5 when the distributor ring 9 is fastened to the main plate 4. Suspension can pass from this opening 20 into the distribution channels 21 of the distributor ring 9 and can be suppled from there to the filter chamber 6.

Figure 4:
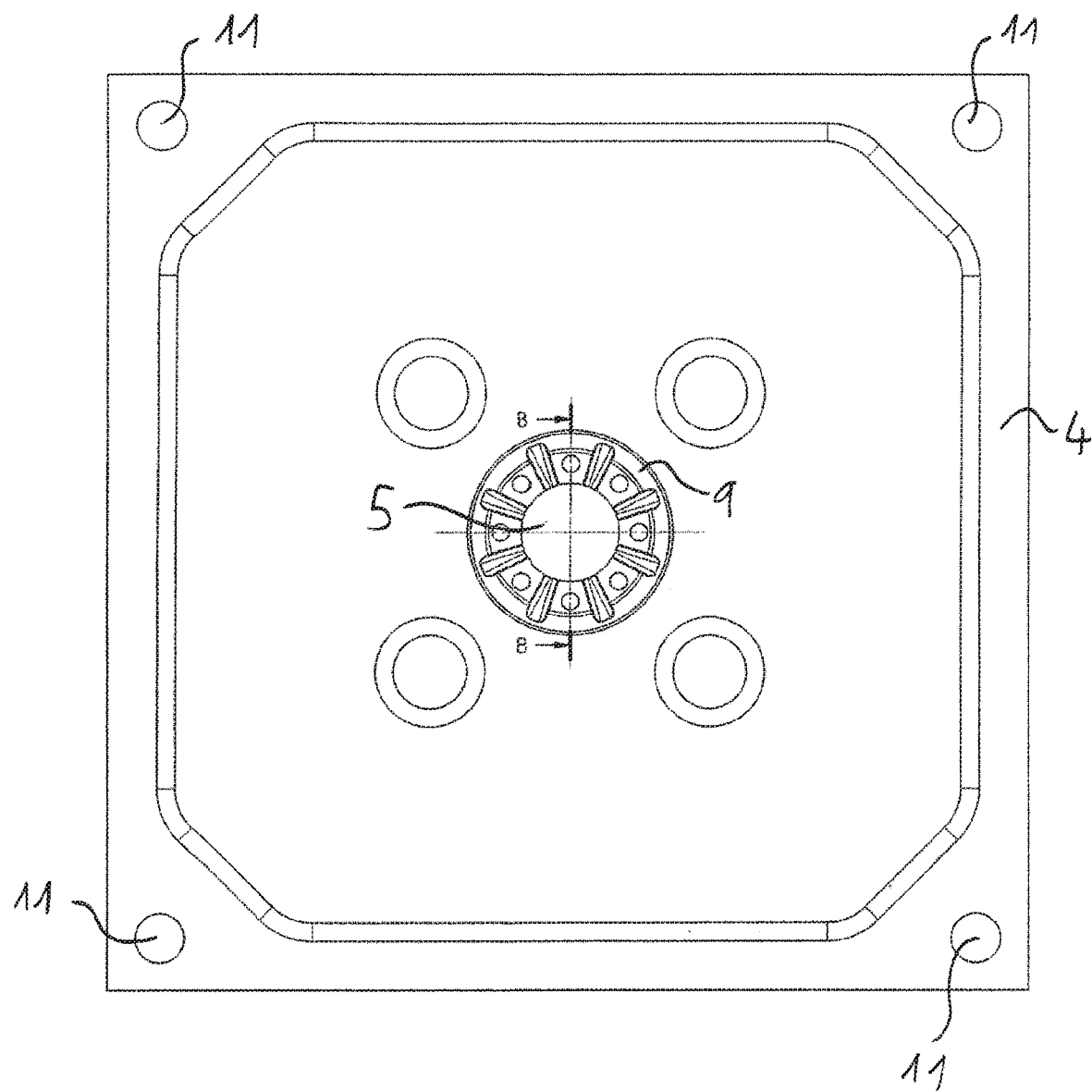
FIG. 4 shows a plan view of the assembly from FIG. 2, wherein the distributor ring is fastened to the filter plate.
Figure 5:
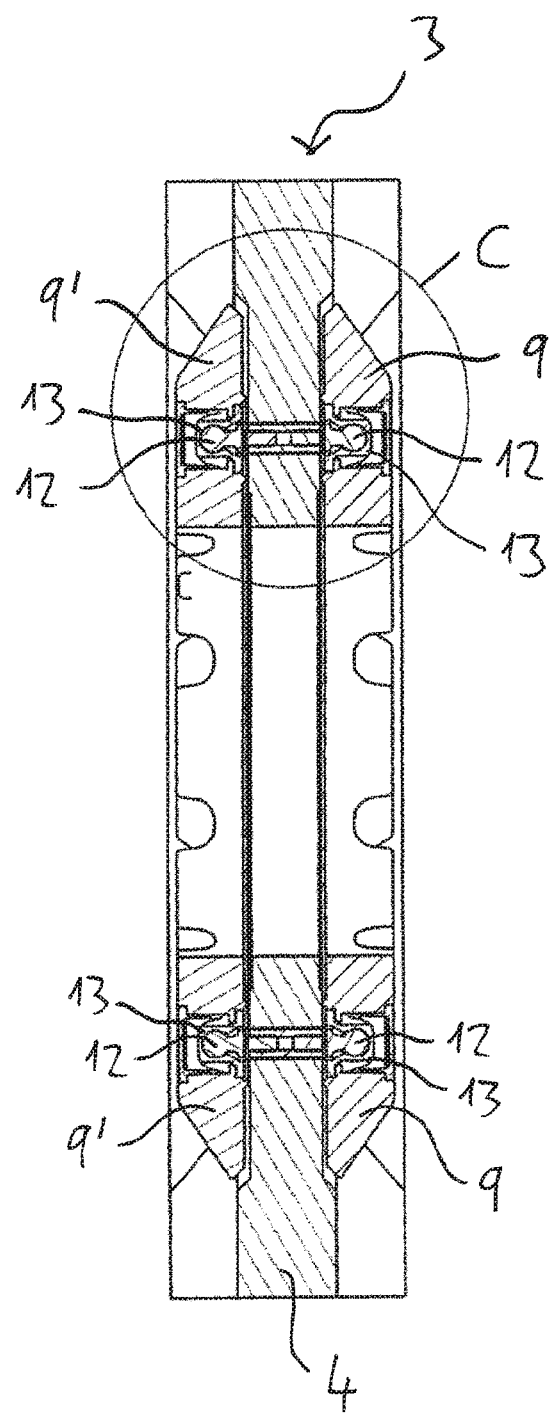
FIG. 5 shows the section B-B from the depiction of FIG. 4.
Figure 6:
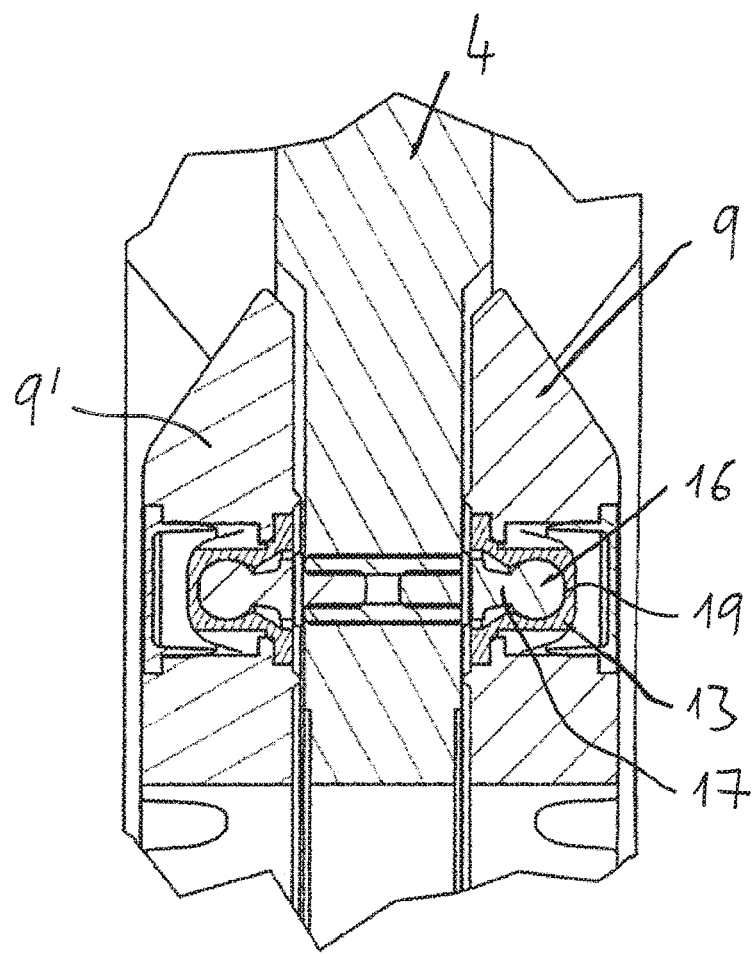
FIG. 6 shows the detail C of the sectional view of FIG. 5.

The fastening of the distributor ring 9 is shown in detail in FIG. 4 and the sectional views of FIGS. 5 and 6. A distributor ring 9, 9' is fastened on each side of the main body 4 of the chamber filter plate 3. As can be seen in particular from FIG. 6, the ball pin 12 comprises a stem 17 and a spherical termination element 16. The ball pin 12 formed by the stem 17 and the spherical termination element 16 is made of a rigid material, such as a metal or a plastics material. In the fastened state of the distributor ring 9, the spherical termination element 16 is situated in the coupling 13, which forms a ball socket 19. The coupling 13 is elastic so that the spherical termination element 16 can be introduced into the coupling 13. The coupling is made of an elastomer, for example.

The maximum transverse extent, i.e. in the present case the diameter of the spherical termination element 16, is greater than the maximum transverse extent of the entry opening of the coupling 13. As the spherical termination element 16 is introduced into the coupling 13, the entry opening of the coupling 13 is thus enlarged. If the spherical termination element 16 bears against the ball socket 19 of the coupling 19, the entry opening of the coupling 13 reduces again on account of the elastic properties of the coupling 13, such that a protrusion of the coupling 13 engages in the transition region between the stem 17 and the spherical termination element 16 and holds the spherical termination element 16 in the coupling 13. In this way a detachable ball-type snap-in connection is produced between the distributor ring 9 and the main body 4.

At the chamber filter plate 3 the distributor ring 9 is fastened as attachment part to the main body 4 of the chamber filter plate 3 by means of a plurality of detachable ball-type snap-in connections, for which the ball pin 12 and the coupling 13 are provided.

A second example embodiment of the assembly according to the invention will be described with reference to FIGS. 7 to 12.

Parts of this second exemplary embodiment that are identical to corresponding parts of the first exemplary embodiment will be denoted to by like reference numerals. With regard to the detailed description of these parts, reference is made to the description of the first exemplary embodiment.

Figure 7:
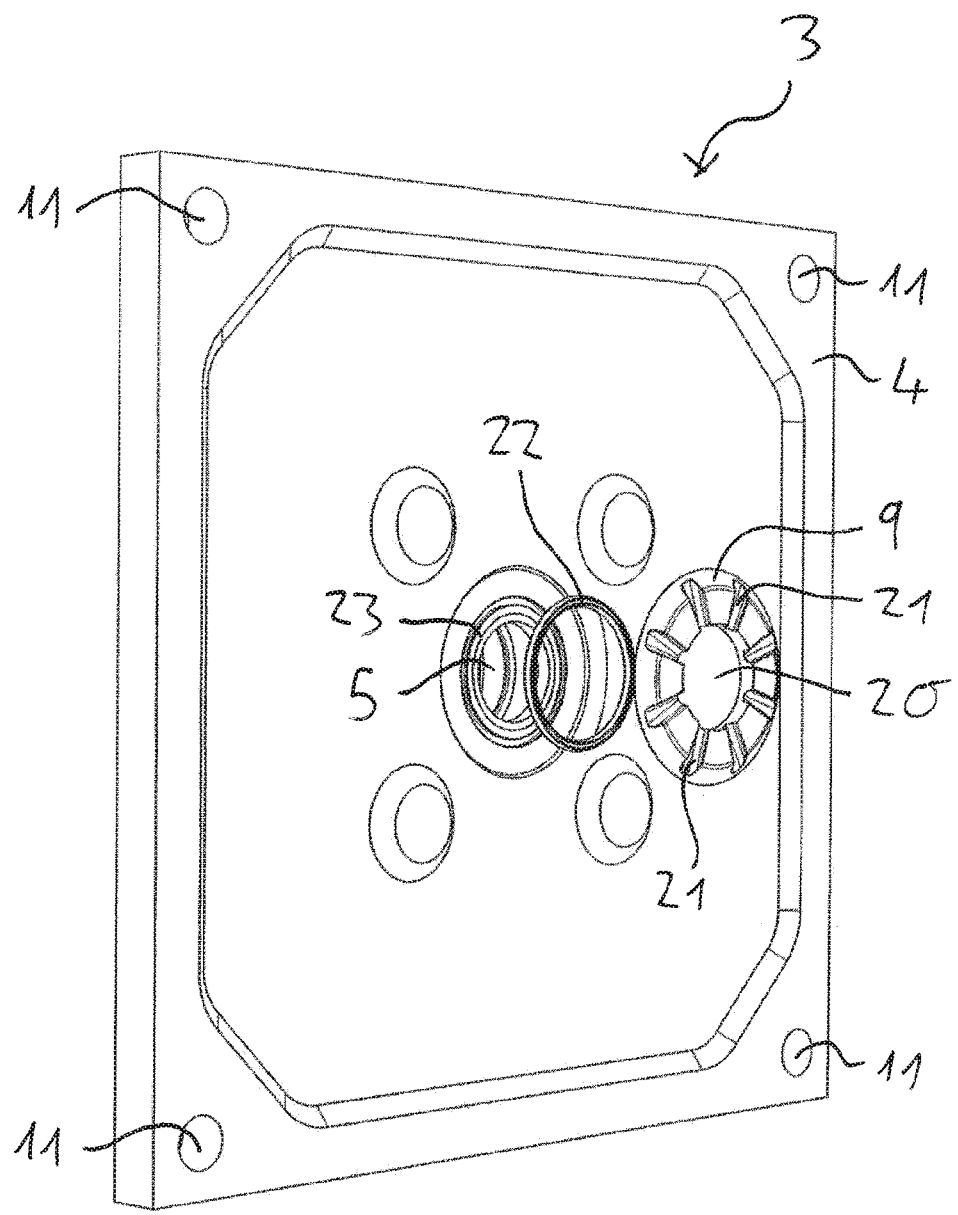
FIG. 7 shows a second exemplary embodiment of the assembly according to the invention.

Similarly to the first exemplary embodiment, the chamber filter plate 3 of the second exemplary embodiment shown in FIG. 7 comprises a central infeed channel 5. A distributor ring 9 is fastened as attachment part to the chamber filter plate 3. The connection is made in the first exemplary embodiment via a detachable ball-type snap-in connection, however this is formed differently as compared to the first exemplary embodiment, as will be described hereinafter:

A ring groove 23 is formed in the main body 4 and runs concentrically around the infeed channel 5. Since the infeed channel 5 is circular in cross-section perpendicularly to the normal of the chamber filter plate 3, a ring groove 23 in this cross-sectional plane is also circle ring-shaped. In other exemplary embodiments the ring groove 23, however, may also have a different form.

Figure 12:
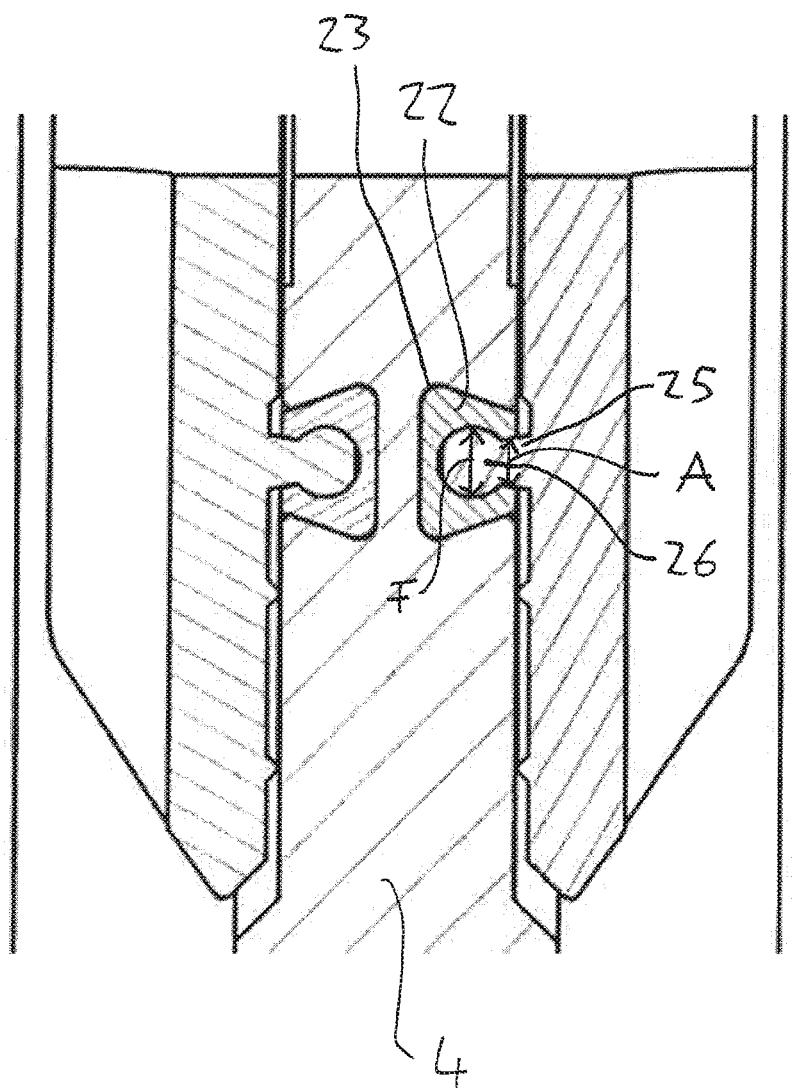
FIG. 12 shows a detail of the sectional view of FIG. 11.

As can be seen in particular from FIG. 12, the ring groove 23 has an annular first entry opening, which leads to an annular first groove hollow body. In a cross-section in the circumferential direction of the ring groove 23, as is shown in FIG. 12, the ring groove 23 is dovetail-shaped. The maximum transverse extent of the first entry opening in a cross-section formed perpendicularly to the circumferential direction of the ring groove 23 is smaller than the maximum transverse extent of the first groove hollow body with this cross-section.

Figures 8, 9:
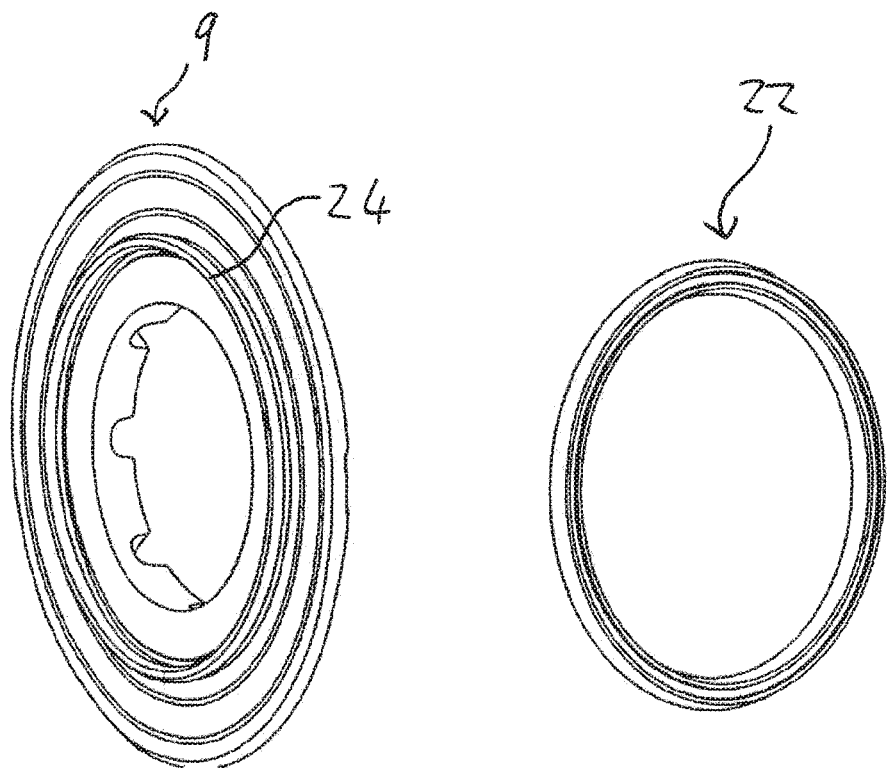
FIG. 8 shows the distributor ring of the second exemplary embodiment of the assembly shown in FIG. 7.
FIG. 9 shows an adapter ring of the second exemplary embodiment of the assembly according to the invention shown in FIG. 7, FIG. 10 schematically shows the cross-section of the adapter ring of the assembly according to the invention shown in FIG. 9.

As shown in FIG. 8, the distributor ring 9 has an annular pin-like protrusion 24 on the side facing the chamber filter plate 3. Furthermore, the ball-type snap-in connection of the second exemplary embodiment comprises an adapter ring 22, which is made of an elastomer, in particular rubber. This adapter ring 22 is shown in FIGS. 9 and 10.

Figure 10:
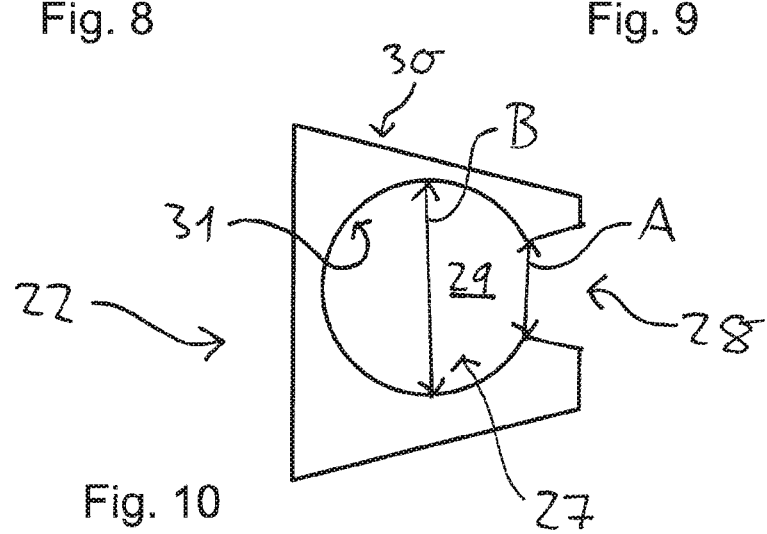

FIG. 10 shows a cross-section of the adapter ring 22 which is formed perpendicularly to its circumferential direction. The outer face 30 of the adapter ring 22 is trapezoidal or dovetail-shaped. This outer face 30 corresponds to the inner face of the ring groove 23. The adapter ring 22 may in this way be inserted into the ring groove 23 such that it sits form-fittingly in the ring groove 23. A further ring groove 27 is also formed in the adapter ring 22. This further ring groove 27, however, has a different form as compared to the ring groove 23 in the main body 4 of the chamber filter plate 3. It has an annular second entry opening 28. The second entry opening 28 is adjoined by an annular second groove hollow body 29. The maximum transverse extent A of the second entry opening 28 in the cross-section shown in FIG. 10 is smaller than the maximum transverse extent F of the second groove hollow body 29 with this cross-section.

Figure 11:
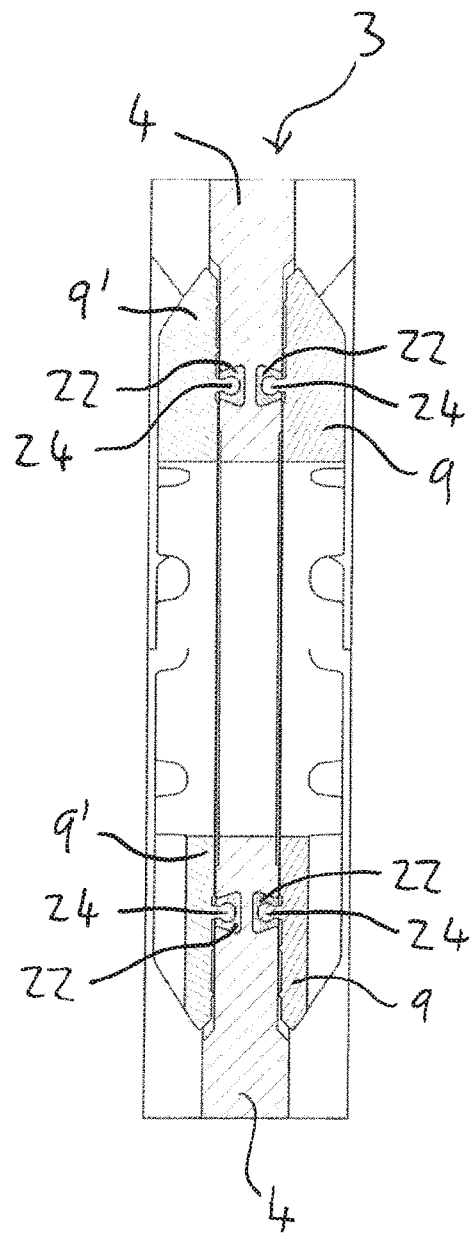
FIG. 11 shows a sectional view of the second exemplary embodiment of the assembly according to the invention, in which two distributor rings are connected to the filter plate on both sides thereof.

As shown in particular in FIGS. 11 and 12 the annular pin-like protrusion 24 of the distributor ring 9, in a cross-section formed perpendicularly to the circumferential direction thereof, has an eyebolt 25 which is adjoined by a spherical annular termination element 26. The geometry of the annular pin-like protrusion 24 thus corresponds to the further ring groove 27 of the adapter ring 22. As shown in FIGS. 11 and 12, the adapter ring 22 may thus be inserted into the ring groove 23. The annular pin-like protrusion 24 of the distributor ring 9 may also be inserted into the further ring groove 27 of the adapter ring 22, such that a detachable ball-type snap-in connection is formed between the distributor ring 9 and the main body 4 of the chamber filter plate 3.

FIG. 11, similarly to FIG. 5, shows the connection of two distributor rings 9 and 9' to the main body 4 of a chamber filter plate 3 via the ball-type snap-in connection of the second exemplary embodiment, wherein FIG. 12 shows a detailed view of this ball-type snap-in connection.

Figure 13:
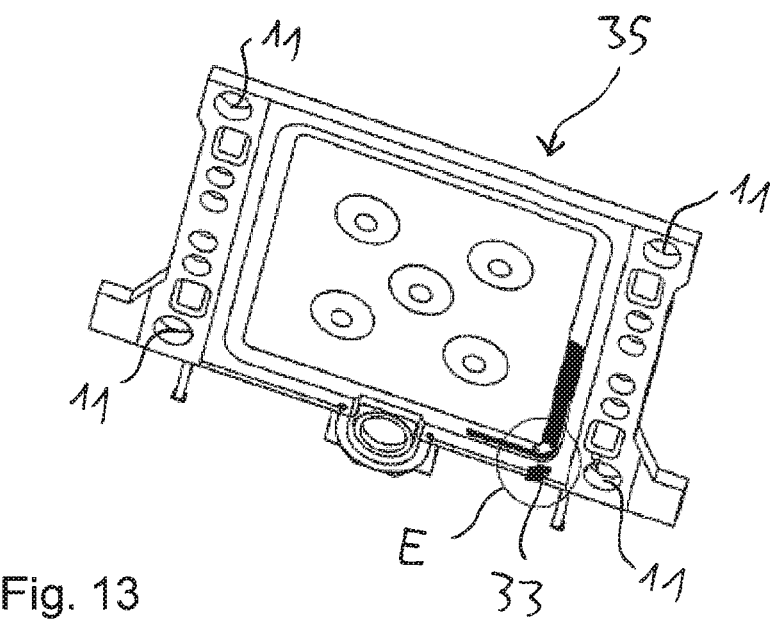
FIG. 13 shows a third exemplary embodiment of the assembly according to the invention.

A third exemplary embodiment of the assembly according to the invention will be described with reference to FIGS. 13 to 15.

In a filter plate 35, an abrasion protection means 33 is arranged in the outfeed for the filtrate. This abrasion protection means 33 is used to protect the outfeed opening or the walls of the discharge channel if, for further drying of a filter cake, compressed air is blown against the exit direction of the filtrate through the discharge channel.

The abrasion protection means 33 is formed as an insert in the filter face. As shown in FIG. 14 it therefore has nubs on the upper side for supporting a filter cloth. The underside of the abrasion protection means 33, facing away from the upper side, faces towards a discharge channel for the filtrate. As shown in FIG. 13, the filter plate 33 has filtrate bores 11 in the corners. From these filtrate bores 11, which are arranged in alignment in the case of adjacent filter plates 35, branch bores pass to the discharge channel. As shown by way of example in FIG. 13 in the lower right-hand corner, the abrasion protection means 33 is arranged at the outlet opening of such a branch bore.

Figure 14:
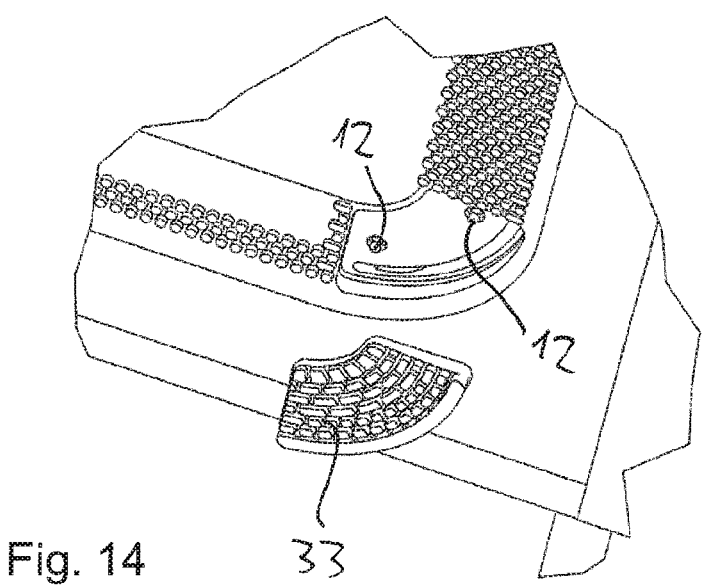
FIG. 14 shows the detail E of the third exemplary embodiment of FIG. 13.
Figure 15:
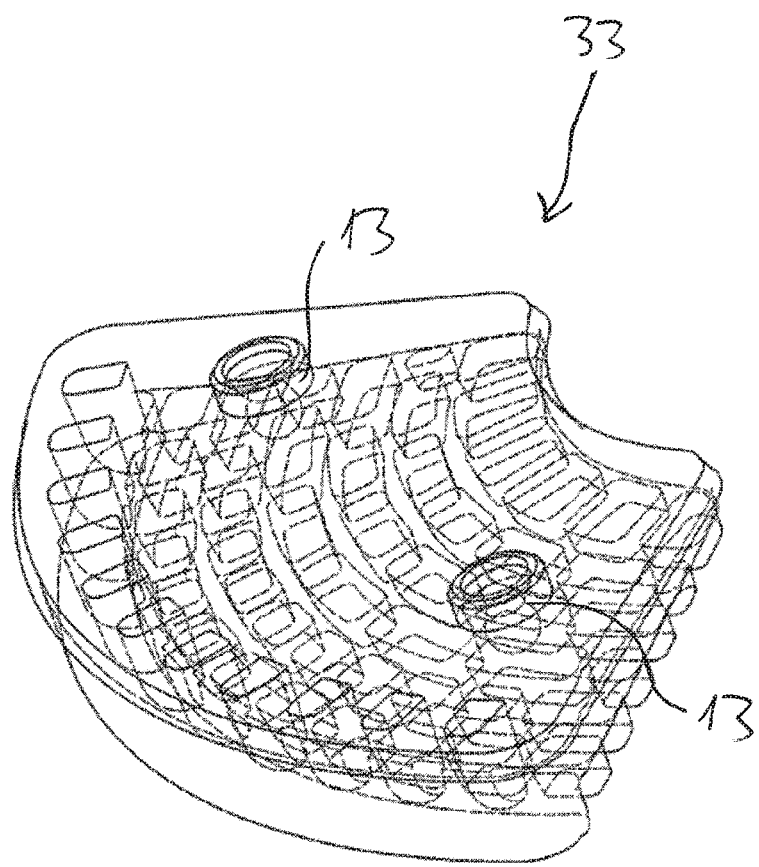
FIG. 15 shows an abrasion protection means of the third exemplary embodiment of the assembly according to the invention shown in FIG. 13.

In order to fasten the abrasion protection means 33, two ball pins 12 are formed at the filter plate 34, as shown in FIG. 14, and, as shown in FIG. 15, two couplings 13 are formed at the abrasion protection means 33. The ball pins 12 and the couplings 13 provide a snap-in connection, via which the abrasion protection means 33 is connected to the filter plate 34 and can be held thereagainst by means of elastic forces. Alternatively, the abrasion protection means 33 could also be connected to the filter plate 34 by means of a ring groove 23 and an annular pin-like protrusion 24 in the exemplary embodiment shown in FIG. 7.

In other exemplary embodiments other attachment parts are fastened to the filter plate via at least one above-described detachable snap-in connection at a channel to the filter chamber 6. For example, the support ring 10 can be fastened to the main body 4 in this way. Furthermore, a protective cover for a filter cloth 7 can be fastened to one of the filter plates 2 and 3 via a detachable snap-in connection.

The attachment part may also be formed as a supporting cam, Similarly to the distributor ring 9, the supporting cam may protrude in the transverse direction. It is used to support a base of the filter plate 2 on a corresponding supporting cam of an opposite base of an adjacent filter plate 3 in a filter press. The supporting cam can be connected to the filter plate 2, 3 via at least one above-described detachable ball-type snap-in connection. An opening may also be formed in the supporting cam, such that said opening surrounds the opening of the infeed channel 5.

Furthermore, a membrane can be connected to the filter plate 2, for example in the region of the four corners, via the above-described detachable ball-type snap-in connections. The membrane is pre-fixed via these ball-type snap-in connections. The membrane is then ultimately held securely in place as the filter press in closed.

LIST OF REFERENCE NUMERALS 1 filter plate pack
2 membrane filter plate
3 chamber filter plate
4 main body
5 infeed channel
6 filter chamber
7 filter cloth
8 filtration path
9, 9' distributor ring
10 support ring
11 filtrate bore
12 ball pin
13 coupling
14 first contact face
15 second contact face
16 spherical termination element
17 stem
18 ring seal
19 ball socket
20 opening
21 distribution channels
22 adapter ring
23 ring groove
24 annular pin-like protrusion
25 eyebolt
26 spherical annular termination element
27 further ring groove
28 second entry opening
29 second groove hollow body
30 outer face of the adapter ring
31 inner face of the adapter ring 32 filter chamber boundary surface
33 abrasion protection
34 discharge channel
35 filter plate

What is claimed is:

1. An assembly comprising:
a filter plate for a filter press and at least one attachment part, wherein
the filter plate has a filter chamber boundary surface, by which a filter chamber to be formed in the filter press can be bounded,
at least one channel for a fluidic connection to the filter chamber boundary surface is formed in the filter plate, and
the attachment part is fastened to the filter plate at the channel, wherein the attachment part is detachably fastened to the filter plate by at least one detachable ball-type snap-in connection, the ball-type snap-in connection comprising at least one ball pin and at least one coupling, the at least one ball pin being arranged on one of the filter plate and the attachment part, the at least one coupling being made of an elastomer and arranged on an opposite one of the filter plate and the attachment part from that of the one of the filter plate and the attachment part on which the at least one ball pin is arranged.

2. The assembly according to claim 1, wherein the attachment part has an opening, which is arranged in the channel.

3. The assembly according to claim 2, wherein the filter plate has a first contact face around an opening forming the channel, and the attachment part has a second contact face around the opening, and in that the ball-type snap-in connection is formed in a region of the first and second contact faces, such that, when the attachment part is connected to the filter plate, the first and second contact faces are held in abutment against one another.

4. The assembly according to claim 3, wherein a ring seal is arranged between the filter plate and the attachment part at the first and second contact faces.

5. The assembly according to claim 1, wherein the attachment part is a distributor ring and the channel is an infeed channel for supplying the suspension that is to be filtered into the filter chamber, wherein a suspension that is to be filtered can be supplied to the filter chamber by the distributor ring.

6. The assembly according to claim 1, wherein the attachment part is a support ring, and the channel is an infeed channel for supplying the suspension that is to be filtered into the filter chamber, the support ring arranged adjacently to a distributor ring, through which a suspension that is to be filtered can be supplied to the filter chamber.

7. The assembly according to claim 1, wherein the attachment part is formed as a supporting cam.

8. The assembly according to claim 1, wherein the attachment part is an abrasion protection means.

9. The assembly according to claim 8, wherein the channel is a discharge channel for discharging the filtrate from the filter chamber and the abrasion protection means is arranged on or at the discharge channel or at an outfeed opening of the discharge channel.

10. The assembly according to claim 1, wherein the ball pin comprises a stem, which is adjoined by a spherical termination element and the coupling comprises a ball socket for receiving the spherical termination element.

11. The assembly according to claim 10, wherein the coupling has an entry opening for the spherical termination element of the ball pin and a maximum transverse extent of the spherical termination element is greater than a maximum transverse extent of the entry opening of the coupling.

12. The assembly according to claim 1, wherein the attachment part is fastened to the filter plate by a plurality of ball pins and corresponding couplings, wherein the ball pins and the corresponding couplings are arranged around an opening of the attachment part and an outlet opening of the channel.

13. The assembly according to claim 1, wherein the attachment part is made of a material that is different from the elastomer of which the at least one coupling is made.

14. An assembly comprising:
a filter plate for a filter press and at least one attachment part, wherein
the filter plate has a filter chamber boundary surface, by which a filter chamber to be formed in the filter press can be bounded,
at least one channel for a fluidic connection to the filter chamber boundary surface is formed in the filter plate, and
the attachment part is fastened to the filter plate at the channel, wherein the attachment part is detachably fastened to the filter plate by at least one snap-in connection, the attachment part has an opening, which is arranged in the channel, and the attachment part is fastened to the filter plate by at least one detachable ball-type snap-in connection, the ball-type snap-in connection comprising at least one ball pin and at least one coupling, the at least one ball pin being arranged on one of the filter plate and the attachment part, the at least one coupling being made of an elastomer and arranged on an opposite one of the filter plate and the attachment part from that of the one of the filter plate and the attachment part on which the at least one ball pin is arranged.

15. The assembly according to claim 14, wherein the attachment part is a distributor ring and the channel is an infeed channel for supplying a suspension that is to be filtered into the filter chamber, wherein the suspension that is to be filtered can be supplied to the filter chamber by means of the distributor ring.

16. The assembly according to claim 14, wherein the attachment part is a support ring and the channel is an infeed channel for supplying a suspension that is to be filtered into the filter chamber, wherein the support ring is arranged adjacently to a distributor ring, through which the suspension that is to be filtered can be supplied to the filter chamber.

17. The assembly according to claim 14, wherein the attachment part is formed as a supporting cam.

18. The assembly according to claim 14, wherein the filter plate has a first contact face around an opening forming the channel, and the attachment part has a second contact face around the opening, and in that the ball-type snap-in connection is formed in a region of the first and second contact faces, such that, when the attachment part is connected to the filter plate, the first and second contact faces are held in abutment against one another.

19. The assembly according to claim 18, wherein a ring seal is arranged between the filter plate and the attachment part at the first and second contact faces.

20. The assembly according to claim 14, wherein the attachment part is an abrasion protection means.

21. The assembly according to claim 20, wherein the channel is a discharge channel for discharging filtrate from the filter chamber and the abrasion protection means is arranged in or at the discharge channel or at an outfeed opening of the discharge channel.

\* \* \* \* \*